Dec. 27, 1955   O. A. ZEPIK   2,728,588
STAKES FOR LOGGING TRUCKS AND THE LIKE
Filed July 18, 1952
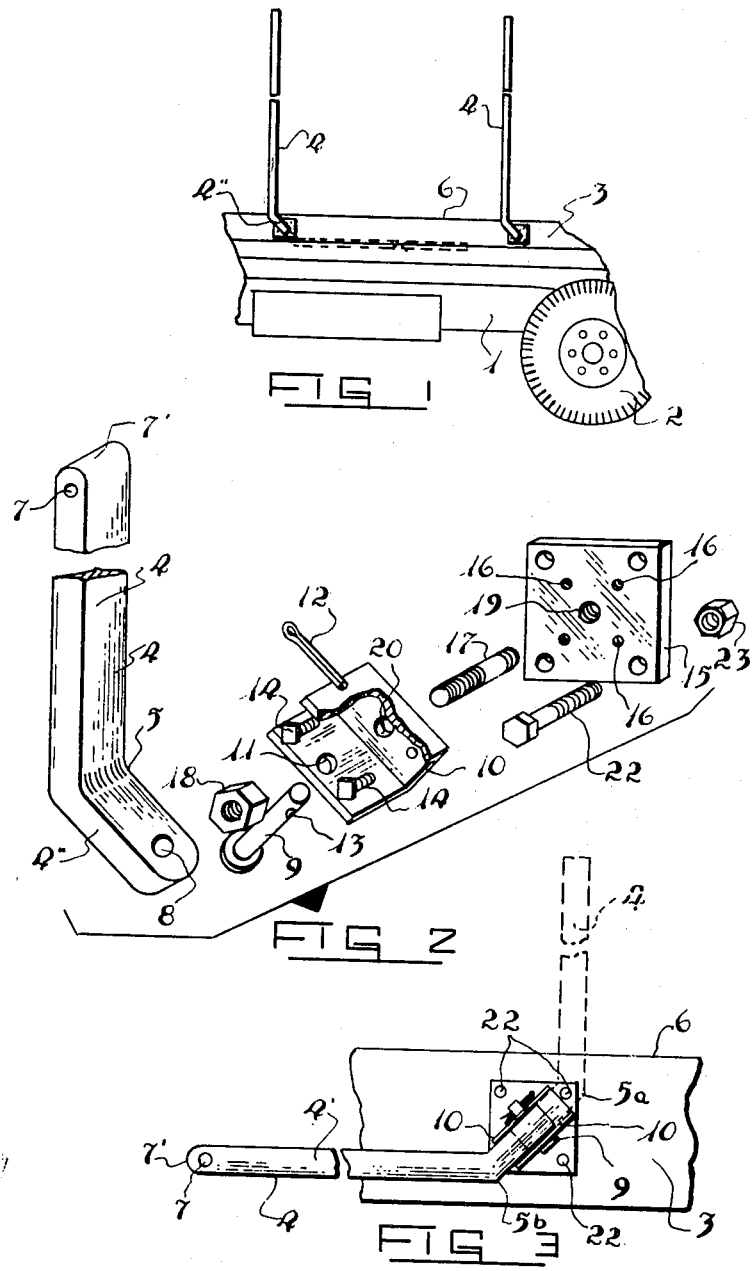
INVENTOR:
OSWALD A. ZEPIK.
BY: Featherstonhaugh & Kent
HIS ATTYS.

United States Patent Office 2,728,588
Patented Dec. 27, 1955

2,728,588

STAKES FOR LOGGING TRUCKS AND THE LIKE

Oswald A. Zepik, Port Arthur, Ontario, Canada

Application July 18, 1952, Serial No. 299,545

5 Claims. (Cl. 280—145)

My invention relates to truck stakes, particularly to hinged body stakes for logging trucks, an object of which is to provide a device of the character herewithin described which is hinged to the body of the truck in a manner that facilitates unloading of logs from such trucks without either imperilling the stakes during this operation, or alternatively necessitating the removal of said stakes to safeguard them during said unloading operation.

Another object of my invention is to provide a device of the character herewithin described which is hingeably attached to the truck body in a manner that eliminates a length limitation commonly affecting conventional hinged stakes, and by so doing contributes to greater efficiency in hauling operations particularly in the logging industry.

A still further object of my invention is to provide a device of the character herewithin described which permits the utilization of truck bodies of more nearly standard width, carrying higher loads, thus contributing to the increased stability of the load, as well as the enhanced maneuverability of the trucks and their ability to traverse narrow forestry trails.

And yet another object of my invention is to provide a device of the character herewithin described which is simple and economical to manufacture and use, and which is moreover, manifestly well suited to the purposes for which it is intended.

With the foregoing objects in view and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a fractional side elevation of a truck whereupon my stakes have been embodied and are depicted in situ, the stakes being shown in their loaded position, the dotted lines indicating the dismounted position of one of the stakes.

Figure 2 is an exploded perspective view of the parts and fittings assembled together to comprise one stake to be mounted upon a truck body.

Figure 3 is a fractional side elevation of a stake mounted, and in situ, upon a truck body with the stake in the unloading or hinged down position.

In the drawings like characters of reference indicate corresponding parts in the different figures.

In logging operations an essential feature is the transportation of relatively heavy, lengthy loads upon trucks, frequently involving trailers or semi-trailers. To permit economically proportioned loading of the said vehicular equipment it is essential that vertically oriented stakes be fitted to the decks to increase the effective load carrying capacity of the vehicle. This requirement is encountered in transporting materials of similar awkwardness and weight in other industries. The conventional means used to provide this may be either disposable stakes of forest cut limbs or trunks, or permanently mounted hinged stakes.

The former are obviously time consuming and inefficient. In the case of the latter several disadvantages and undesirable features are commonly experienced. If the said stakes are long enough to facilitate the maximum possible economical load they are in danger of being fouled by the load when the stake is hinged out of the way for unloading. In that case damage is frequently caused to the stake itself and/or the vehicle structure as well. To overcome this the stakes are sometimes restricted to a short length determined by the height of the deck from the road surface. In this way, the stakes swing freely beneath the vehicle deck when unloading. However, this limits the length of the stake and consequently the height of the load. To increase the load carrying capacity of the vehicle and still retain the same reduced stake length, the vehicle is made wider, which results in reduced stability with consequent hazard to the vehicle in the event of a load upset, and also makes it necessary to increase the width of forest roads to accommodate these wider transport vehicles. My invention eliminates these disadvantages and difficulties.

Proceeding now to describe my invention in detail, reference is made to the accompanying drawings in which the vehicular body 1 is depicted, supported upon wheels 2 and equipped with guard railing 3 to which brackets for securing stakes, collectively designated 4, are attached.

The stake is, in this case, especially modified. In lieu of the conventional straight elongated bar of rectangular cross-section, my stake is conventional for the greater or major part 4' of its length. The lower end 4'' however is fabricated with what I define as an octofid flexure, the portion beyond the point of flexure 5 being short and sufficient only for positioning the stake when in stowed position, as in Figure 3, just below the guard rail edge 6. In other words the stake is bent through an angle of approximately 45° at this point. The extremities of the stake end are rounded, concentrically with the two apertures described hereinafter.

One aperture 7 at the upper end 7' of the stake is, in this position, conventionally utilized for threading through with a tension chain over and across the load, serving to mutually reinforce opposing stakes. The other aperture 8 is provided in the lower portion of the aforementioned flexed end of the stake, to receive pivot pin 9 adjacent the distal end of the lower portion. The aforementioned bend in the stake is such that the major portion 4' of the stake is inclined at 45° in a direction parallel with the pivotal axis of the stake upon the pivot pin 9.

This pivot pin is retained in hinge bracket 10 in opposed apertures, one of which only 11 is depicted. A conventional cotter key 12 is fitted into keyway 13 in the pivot pin after assembly.

Bolts 14 selectively secure hinge bracket 10 diagonally to swivel plate 15 and are threaded into apertures 16 in said swivel plate, provided for this purpose.

Swivel stud 17 constitutes a swivelling attachment for aforesaid hinge bracket 10 to swivel plate 15, together with threaded aperture 19 and nut 18 which thread upon the two ends of said stud. Said swivel stud is fitted through aperture 20 in the base of the aforesaid hinge bracket and threaded through corresponding aperture 19 in swivel plate 15.

Attachment bolts 22 and nuts 23 secure the aforesaid swivel plate 15 to the guard rail 3 of the vehicle, which completes the items required to make the assembly of my modified stake.

It will be apparent that my stake, in vertical position, is just slightly offset from the point of pivotal attachment through pivot aperture 8, the amount of the offset being the horizontal distance between the axis of the stake and the swivel plate center line. The stake is retained in vertical position and secured against the strain imposed by the load by means of a conventional quick release mechanism, which is not illustrated in the accompanying drawings herewith appended.

When released, the pressure of the load will reinforce the effect of gravity on the stake and the stake will pivot downwardly about aforesaid pivot pin 9. Due to the angulation of the lower end of the stake, and of the corresponding hinge bracket 10, the point of flexure 5 will describe an arc, the center of which is the axis of pivot pin 9, the radius being the distance of said flexure point from said axis. The plane in which said arc is described will be that which passes through the octofid axis of the hinge bracket 10. When the said point of flexure has completed its arc swing, said point will have changed its position from that designated 5a to that designated 5b, in the accompanying drawings. In the accompanying claims the path described by the stake is defined as moving to generate a portion of the frustum of a cone.

The uppermost extremity of the stake 4 containing aperture 7 will likewise necessarily describe an arc which will lie in a plane parallel to that containing the aforedescribed arc designated 5a and 5b. When this arc has been swept through by the stake extremity the stake proper will have moved from the vertical, normally loading, position to the horizontal, stowed position depicted in Figure 3, of the accompanying drawings. In this position the load may be dumped with safety: that is, without endangering the stakes. Also the vehicle may be operated empty with the stakes secured in this stowed position.

On the other hand, if conditions and the character of the load or other considerations make it desirable, the stakes may be reversed and used in reverse position. In lieu of pivotal attachment through aperture 8, as heretofore described, the pivot aperture 7 at the other extremity of the stake may be pin connected to hinge bracket 10, after said hinge bracket is adjusted to an axis-vertical alignment. This is accomplished by removing studs 14, repositioning hinge bracket 10 and replacing said studs. The said repositioning is facilitated by the aforementioned swivelling of the said bracket about stud 17, mounted in threaded aperture 19 within swivel plate 15. It will probably be necessary to ease nut 18 in order to permit this repositioning.

In vertical position, then, the reversed stake will have the octofid extremity at the upper end and may be arranged to angulate inwardly towards the longitudinal axis of the vehicle or oppositely. When in lowered position, however, the ends of the stakes will rest on the ground at an angle and will thus constitute an incline which will facilitate unloading of some particular kind of material. In any event this reverse installation provides an additional integral feature which incorporates the more conventional stake form in one and the same assembly.

A comparatively simple rearrangement of the swivel plate and bracket in each case places the two alternatives at the disposal of the operator without substitution of, or additions to, the same assembly of parts.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A stake assembly for logging trucks and the like comprising in combination a stake, said stake being bent through an angle of approximately 45° to form a major portion and a lower portion, a hinge bracket, means detachably to secure said hinge bracket to the side of said truck, said stake being pivotally secured to said hinge bracket by the distal end of the lower portion thereof, so that the axis of said pivotal securement is substantially at 45° from the horizontal, said major portion of said stake being inclined at approximately 45° in a direction parallel to the pivotal axis of said pivot pin, said hinge bracket and said stake co-operating together whereby the major portion of said stake is adapted to be moved to generate a portion of the frustum of a cone from the vertical position to the horizontal position and vice versa.

2. The device according to claim 1, in which said means includes a swivel plate secured to the side of said truck, said hinge bracket being selectively secured for parallel rotation to said swivel plate.

3. The device according to claim 1, in which said hinge bracket comprises a relatively short length of channel, the lower end of said stake nestling between the walls of said channel and being pivotally secured thereto.

4. The device according to claim 2, in which said hinge bracket comprises a relatively short length of channel, the lower end of said stake nestling between the walls of said channel and being pivotally secured thereto.

5. The device according to claim 1, in which said means includes a swivel plate secured to the side of said truck, pivotal means securing said bracket to the face of said swivel plate, and means selectively engageable through said hinge bracket and said swivel plate to maintain said bracket at the desired angular relationship with said swivel plate.

References Cited in the file of this patent

UNITED STATES PATENTS

| | | |
|---|---|---|
| 150,695 | Martin | May 12, 1874 |
| 868,805 | Peterson | Oct. 22, 1907 |
| 2,644,715 | Sammis | July 7, 1953 |

FOREIGN PATENTS

| | | |
|---|---|---|
| 18,710 | Great Britain | Nov. 23, 1911 |